United States Patent
Lenk et al.

(12) 
(10) Patent No.: US 6,528,976 B1
(45) Date of Patent: Mar. 4, 2003

(54) FET SENSING PROGRAMMABLE ACTIVE DROOP FOR POWER SUPPLIES

(75) Inventors: Ronald J. Lenk, Sunnyvale, CA (US); Nazzareno Rossetti, Danville, CA (US); Kimble Smith, Mountain View, CA (US); James Holt, Los Altos, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 17 days.

(21) Appl. No.: 09/656,499

(22) Filed: Sep. 7, 2000

Related U.S. Application Data (60) Provisional application No. 60/155,934, filed on Sep. 24, 1999.

(51) Int. Cl.[7] .................................................. G05F 1/40
(52) U.S. Cl. ........................................ 323/282; 323/224
(58) Field of Search .................. 363/16, 131; 323/224, 323/282, 284, 351

(56) References Cited

U.S. PATENT DOCUMENTS

| | | | | |
|---|---|---|---|---|
| 5,081,374 A | * | 1/1992 | Davis | 307/451 |
| 5,982,160 A | * | 11/1999 | Walters et al. | 323/282 |
| 6,057,607 A | * | 5/2000 | Rader, III et al. | 363/131 X |

* cited by examiner

*Primary Examiner*—Jessica Han
(74) *Attorney, Agent, or Firm*—Townsend and Townsend and Crew LLP (57) ABSTRACT

A switching regulator having an active droop voltage generator that is responsive to a drain-to-source current of a current sense element within the switching regulator. A droop signal affects the duty cycle of a pulse-width modulated signal generated by control loop. The pulse width modulated signal is fed back to the input of the switching regulator to control the amount of droop. The droop voltage generator is programmable, having a selectable gain-setting resistor.

20 Claims, 7 Drawing Sheets

FIG. 8 PWM Control Loop

FIG. 9

FET SENSING PROGRAMMABLE ACTIVE DROOP FOR POWER SUPPLIES

This applications claims the benefit of No. 60/155,934, filed Sep. 24, 1999.

BACKGROUND OF THE INVENTION

The present invention relates in general to power supply circuitry, and in particular to method and circuitry for implementing programmable active droop for power supply voltage regulators.

Figure 1:
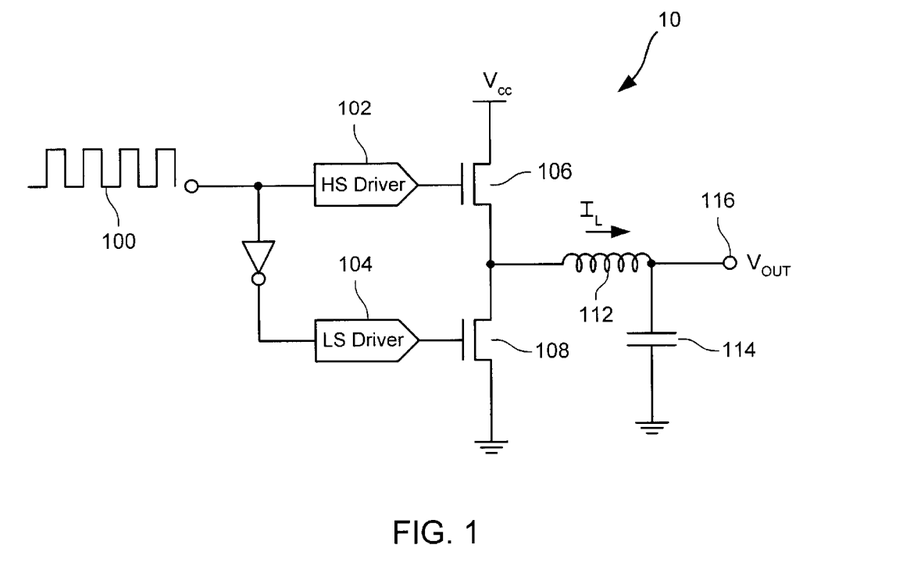
FIG. 1 is a simplified diagram of a switching voltage regulator.

A particular type of voltage regulator is a switching voltage regulator. A simplified schematic of a switching voltage regulator 10 is shown in FIG. 1. A periodic signal, 100 is applied to a high-side driver 102 and a low-side driver 104, which in turn drive high-side switch 106 and low-side switch 108, respectively. Inverter 110 ensures that low-side switch 108 remains off when high-side switch 106 is on. When high-side switch 106 is on (low-side switch 108 off), current flows through inductor 112 and stores energy in a magnetic field of inductor 112. When low-side switch 108 turns on, the energy stored in inductor 112 is transferred to a filter capacitor 114 at an output 116 of the switching regulator 10. Filter capacitor also functions to smooth the signal at output 116. The output signal is, therefore, nearly a DC voltage and, for a periodic square wave input signal, this output signal is directly proportional to the duty cycle of the input signal.

Modern power supplies are often required to have a very tightly regulated output voltage even during transients, which are caused, for example, by sudden changes in load current demands. When a switching regulator is supplying a large current and then is suddenly required to supply a substantially smaller current, voltage transients at the output may be large enough to exceed the acceptable voltage output limit. To counter this problem switched voltage regulators sometimes include a droop function, whereby the output voltage of the power supply is lowered when the output load current increases, so that there is additional headroom for transients. In such a system, when the output load transitions from heavy to light (i.e., high output current to low output current), the voltage is initially towards the low end of its acceptable range. The current output from the power supply's inductor (which takes time to decrease both because of its reactance and the delay in the power supply's control loop) charges the output capacitors of the power supply, and the output voltage may increase further without hitting the high end of the acceptable range compared with the output voltage if the initial voltage was not lowered. The same effect is true in reverse, i.e. for light to heavy load conditions. The net effect is that the number of output capacitors the power supply requires to meet the transient load regulation is decreased, thereby decreasing cost and circuit size.

The improvement in transient response is commonly realized by first adding a constant positive offset voltage to the output of the power supply when operating at no load current, so as to maximize the voltage headroom when the load current increases. The droop is then typically accomplished passively, by placing a series resistor at the output of power supply so that as the load current increases, the output voltage drops. The problem with this "passive" approach is that the efficiency of the regulator is compromised due to power dissipated by the series resistor.

Droop can also be generated actively, for example by measuring the current and amplifying the resultant signal, which may then be used to adjust the output voltage the power supply is producing. The current measurement can be accomplished in a variety of ways, for example with a series resistor, or by measuring the voltage drop across one of the MOSFET power switches, or by averaging the voltage drop across the inductor, etc. Although the latter two schemes do not need to use additional components to implement droop, they have the problem that the amount of droop is set by I×R, where I is the current and R is the resistance of the element being used for current sensing. Once the element is fixed, a change in the load design of the power supply, or in the amount of droop required, cannot be accommodated, since the droop is fixed by a constant I×R. Additionally, any temperature coefficient in the sense resistor R will be reflected as a temperature coefficient in the droop.

What is needed, therefore, are improved methods and circuitry for implementing droop in power supply output voltages.

SUMMARY OF THE INVENTION

The present invention provides method and circuitry for implementing active droop eliminating lossy sensing, while at the same time permitting the amount of droop, as well as the droop temperature coefficient, to be programmed arbitrarily, by using an additional control element.

In a first aspect of the invention, a switching regulator having a droop function is disclosed. An exemplary switching regulator comprises: a high-side switch having a gate coupled to a regulator input configured to receive an input signal, a drain coupled to a power supply and a source; a low-side switch having a gate configured to receive an inverse of the input signal, a drain coupled to the source of the high-side switch and a source coupled to ground; an inductor having a first end coupled to the drain of the low-side switch and a second end providing an output voltage; and an amplifier having inputs coupled to the drain and source of the high-side switch (or the source and drain of the low-side switch) and an output operable to provide a droop voltage signal.

In a second aspect of the invention, a method of providing a droop signal is disclosed. An exemplary method comprises the steps of: A method of maintaining an output voltage of a switching regulator within a voltage range, the method comprising the steps of: measuring a current through a high-side switch (or low-side switch) of the switching regulator; and providing droop signal that is operable to lower an output voltage of the switching regulator as a linear function of the current measured through the switch exceeds a predetermined threshold.

The following detailed description and the accompanying drawings provide a better understanding of the nature and advantages of the present invention.

DESCRIPTION OF THE SPECIFIC EMBODIMENTS

Figure 2:
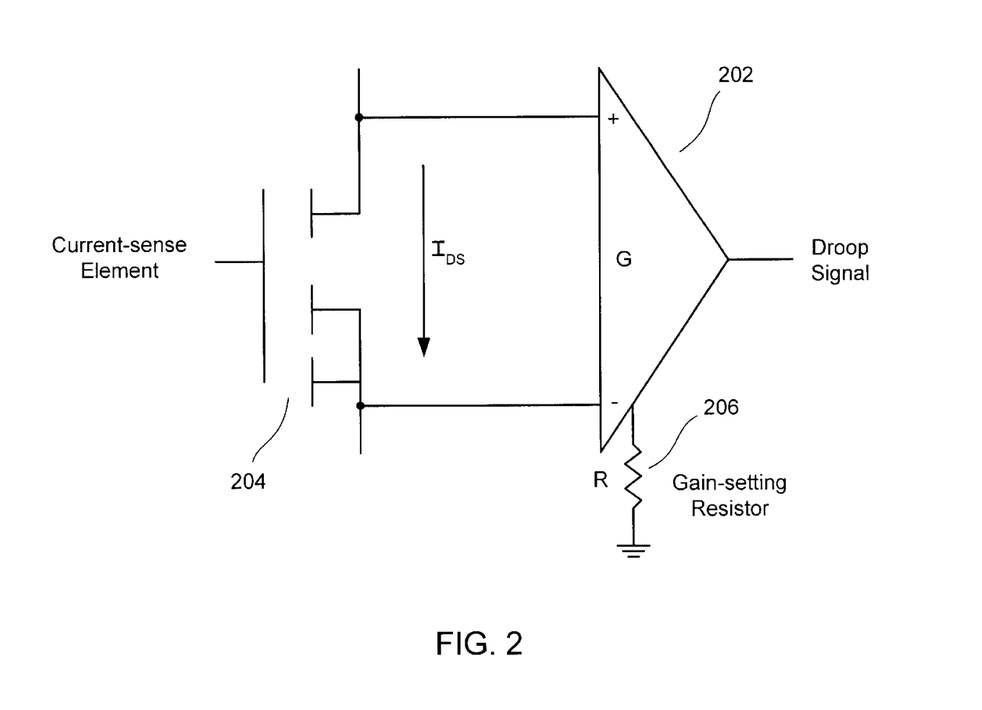
FIG. 2 shows a simplified diagram illustrating the FET-sensing, active droop concept of the present invention.

Referring to FIG. 2, there is shown a highly simplified diagram illustrating the active droop scheme according to an embodiment of the present invention. According to this embodiment, the amount of droop is set by controlling the gain of an amplifier 202 that converts current to voltage, as shown. The current is sensed by measuring differentially the voltage across the regulator's MOSFET switch 204 while it is conducting. The amount measured is set by $I_{DS}$ times $R_{DS}$(on) of the MOSFET, times the gain G of the differential amplifier 202. The gain G of the amplifier 202 is set by a variable resistor 206 so that a different current level or different droop requirement can be incorporated by adjusting resistor 206, without having to change MOSFET 204. The output of amplifier 202 is used to set the amount of droop, for example, by controlling the regulator's reference voltage. This method can also be used to compensate for the positive temperature coefficient of $R_{DS}$(on). By mounting resistor 206 in thermal contact with MOSFET switch 204, and setting the gain from R to G to have a compensating negative temperature coefficient, the current sense can be made practically temperature independent; that is, as the temperature increases, the resistance of resistor 206 increases, which causes G to decrease.

A single resistor in this invention thus permits droop to be set arbitrarily, independent of other operation at the power supply, without the efficiency penalty. It further permits temperature compensation at the current-sense element. Other embodiments will be apparent to those skilled in the art. For example, the differential amplifier may be in an integrated circuit, so that the gain-setting resistor may be attached to a single pin of the IC. The gain could also be set by other means, such as a current source, etc. And the current may be sensed in the low-side MOSFET switch, in which case the current would flow in a direction opposite to that shown in FIG. 2. As another example, a resistor can be coupled to the source or drain of either the high-side MOSFET or low side MOSFET with the amplifier having inputs coupled across the resistor.

Figure 3:
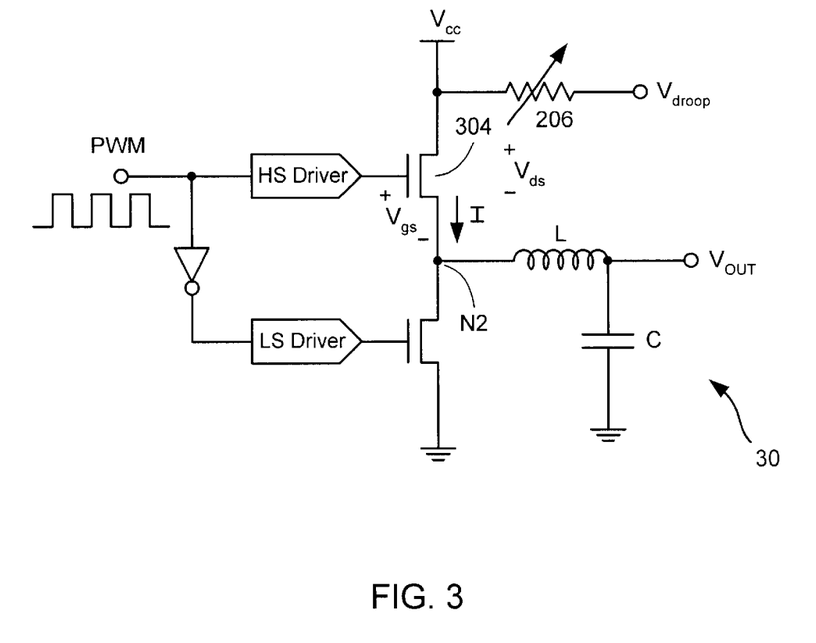
FIG. 3 shows a simplified circuit diagram of a voltage regulator including a gain-setting transitor according to an embodiment of the present invention.

FIG. 3 shows a simplified circuit diagram further illustrating the switching regulator and FET sensing scheme according to an embodiment of the present invention. More specifically, FIG. 3 shows a switching regulator 30, which includes gain resistor 206 as was described in relation to FIG. 2.

Figure 4:
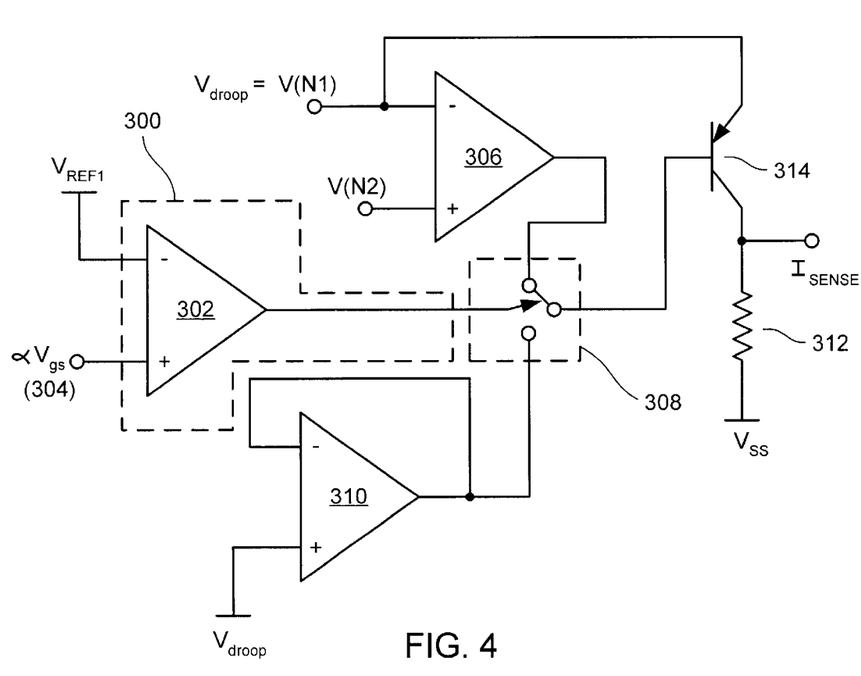
FIG. 4 generally illustrates a FET sensing scheme according to an exemplary embodiment of the present invention.

FIG. 4 generally illustrates the FET sensing scheme according to an embodiment of the present invention. Comparator 302 compares the gate to source voltage ($V_{gs}$) on MOSFET switch 304 to a fixed reference voltage. When VGS is sufficiently greater than, $V_{REF1}$, the output of comparator 302 enables operational amplifier (opamp) 306, by operation of switch 308. Otherwise opamp 310 is enabled. When opamp 310 is enabled, the voltage at the output $I_{SENSE}$ equals the voltage, $V_{SS}$. When the other opamp, 306, is active, that is when the voltage at node N1 is larger than the voltage at node N2 to provide an output voltage that is sufficient to turn transistor 314 on, the voltage $V(I_{SENSE})$ is a function of $V_{ds}$(on) and resistor 206. $V(I_{SENSE})=R(312) \times V_{ds}(on)/R(206)$ or $R(312) \times I_{ds} \times R_{ds}(ON)/R(206)$.

Figure 5:
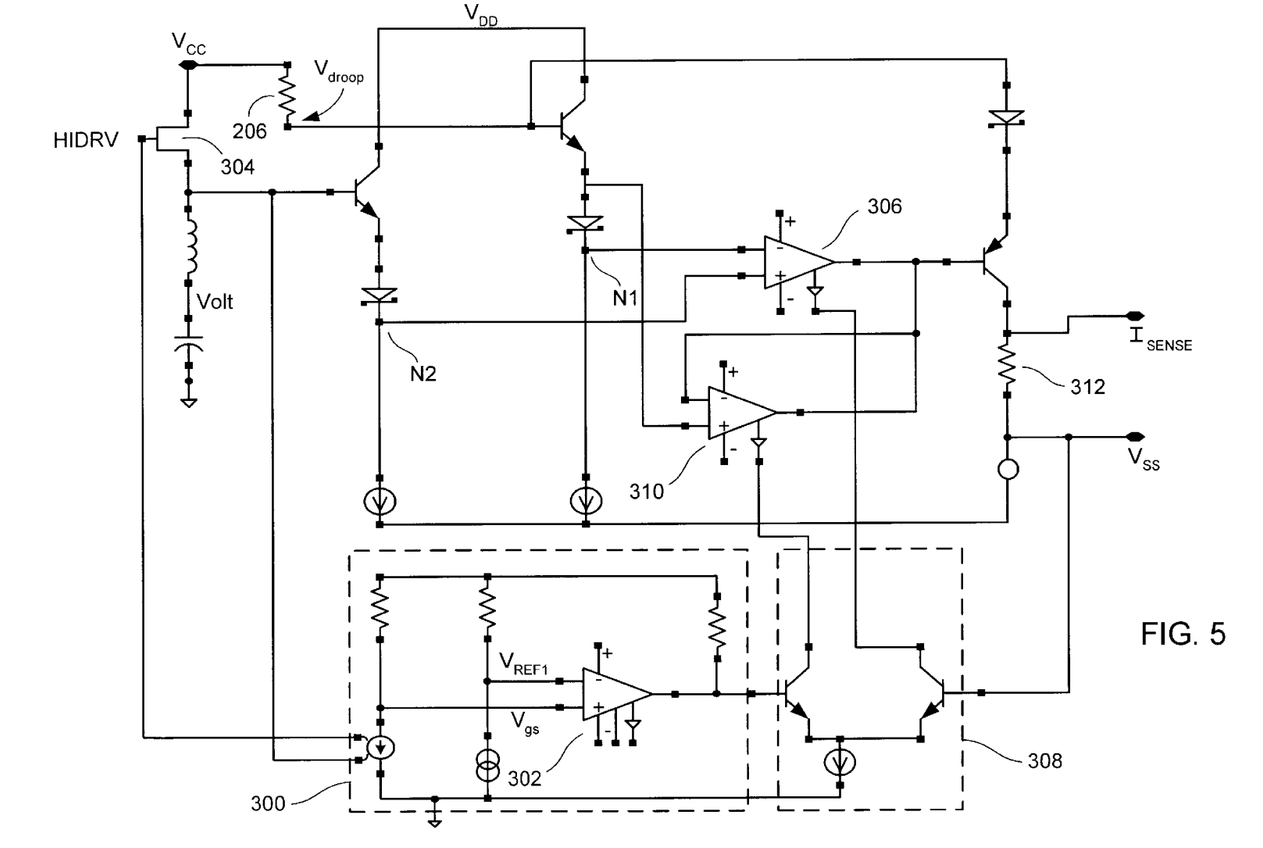
FIG. 5 shows a detailed circuit schematic for implementing the embodiment shown in FIG. 4.

FIG. 5 shows in greater detail circuitry for implementing the embodiment shown in FIG. 4. The components in FIG. 5 that are labeled with the same numbers as in the simplified diagram in FIG. 4 refer to the same elements.

Figure 6:
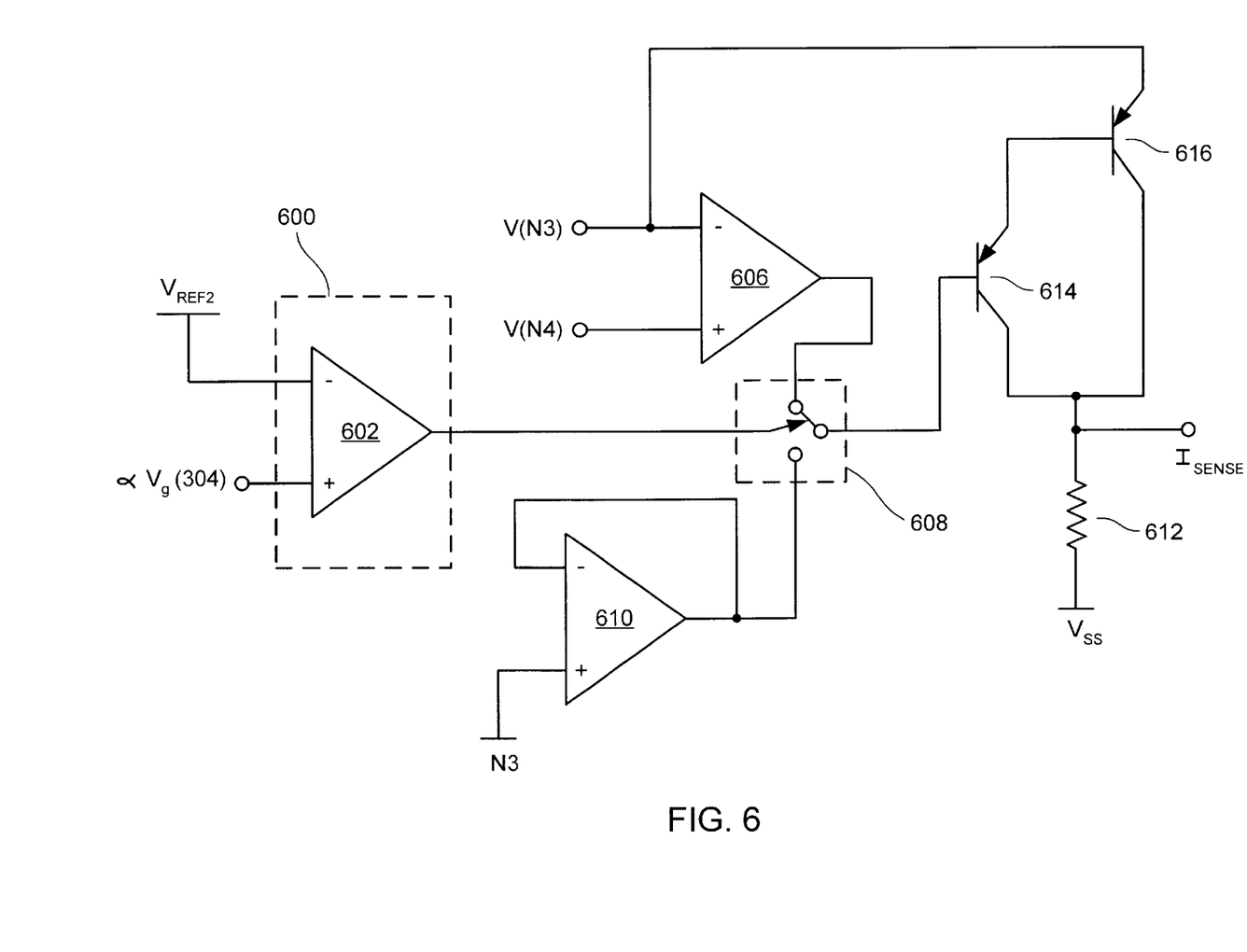
FIG. 6 generally illustrates a FET sensing scheme according to another exemplary embodiment of the present invention.
Figure 7:
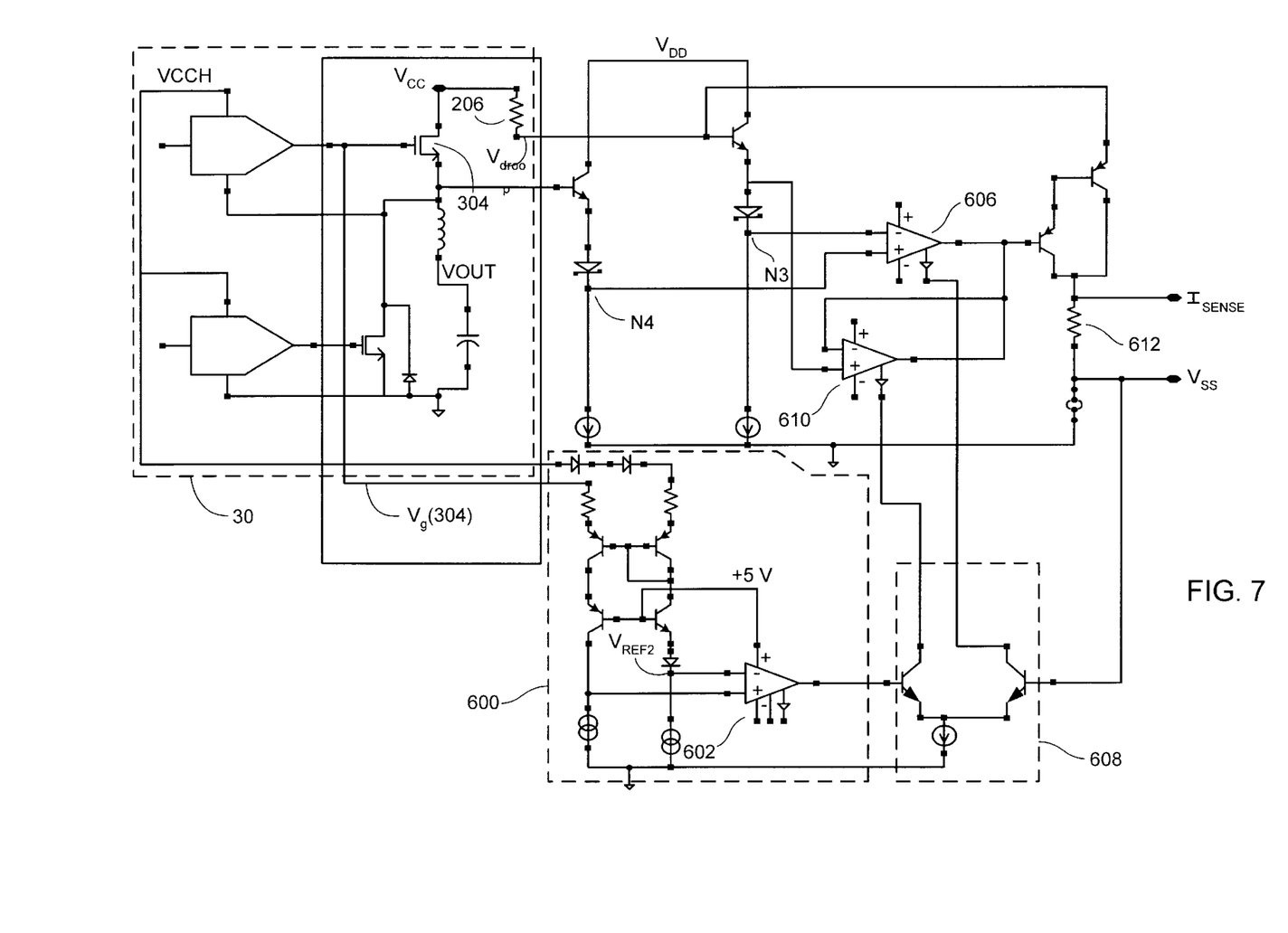
FIG. 7 shows a detailed circuit schematic for implementing the embodiment shown in FIG. 6.

FIGS. 6 and 7 illustrate an alternate embodiment of the circuit implementation shown in FIGS. 4 and 5. The window detect circuit 600 monitors the gate of MOSFET switch 304 and the voltage to its driver, labeled "VCCH." When the voltage at the gate of MOSFET switch 304 is within two diodes of VCCH, opamp 606 becomes active. The overall operation is substantially the same as in the embodiment shown in FIGS. 4 and 5 but this time shown in synchronous step down configuration.

$$V(I_{SENSE}) = \frac{R(612) * IlxRds(ON)}{R(206)} + V_{SS} \text{ when 606 is active}$$

And, $V = V_{SS}$ when 610 is active. The signal $V_{SS}$ is, for example, at about 2.5V and is used to bring Isense into the common mode range of the opamps and comparators.

Figure 8:
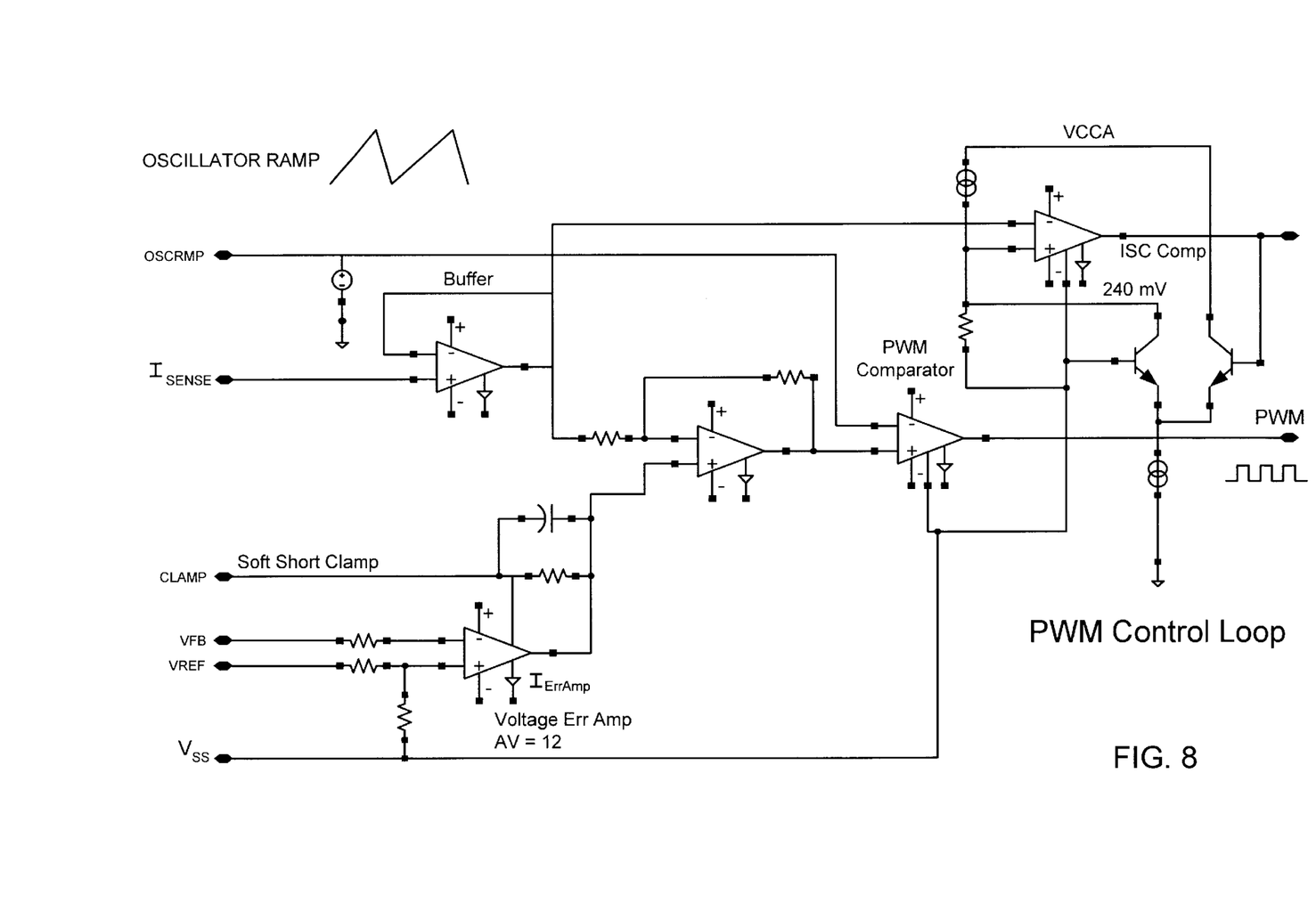
FIG. 8 shows an exemplary pulse width modulator (PWM) control loop according to another aspect of the present invention.

The voltage regulator embodiments in FIGS. 4–7 are driven by an asynchronous pulse width modulated (PWM) voltage controller in step down mode. A simplified and exemplary PWM control loop according to another embodiment of the present invention is shown in FIG. 8. The signal $V(I_{SENSE})$ (See FIGS. 4–7) is fed into a unity gain buffer 800, followed by an amplifier 802 having, for example, a gain of two. A voltage error amplifier 804 having a fixed gain of, for example, 12 provides an amplified version of the difference in input voltages $V_{REF}$ and $V_{FB}$. An opamp 806 sums the voltages, ($V_{REF}-V_{FB}$), and $V(I_{SENSE})$. The sum is then compared to, for example, a 95% ramp by comparator 808 to produce the PWM control signal, which is used to drive MOSFET switch 304 of voltage regulator 30. Comparator 810 operates as a maximum current limit comparator and takes into account the fact that $R_{DS}$(on) can vary from one MOSFET to another by greater than 20%. The current limit is set above the normal operating range of the control ($I_{SC}=1.5I_{MAX}$).

Figure 9:
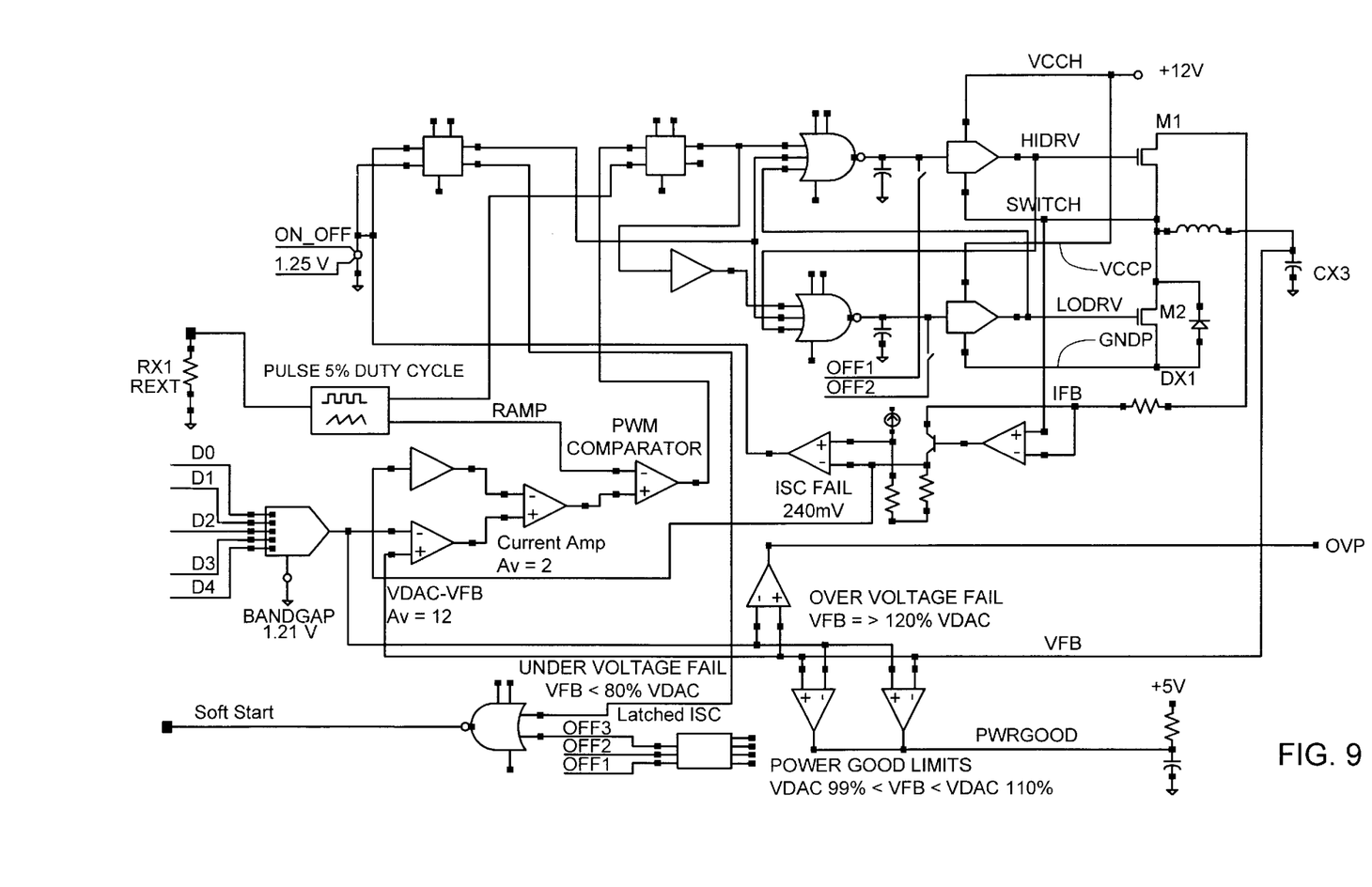
FIG. 9 shows a full system block diagram of an exemplary power supply voltage regulator using active droop according to the present invention.

The proper choice of resistor 206 in FIGS. 4–7, to match the $R_{DS}$(on) of transistor 304 gives the PWM designer active control of load regulation. This control or active droop is used to reduce Vout under heavy load and keep the control transient response within a narrow window, e.g., +50 mV to −70 mV of the initial target. The control loop in FIG. 8 with $2 \times V(I_{SENSE})$ and $(V_{REF}-V_{FB}) \times 12$ results in a maximum droop, active load regulation, of 40 mV, when $12=I_{SC}/1.5$. An exemplary embodiment for a full system lock diagram is shown on the next page in FIG. 9.

The foregoing description of preferred exemplary embodiments has been resented for the purposes of description. It is not intended to be exhaustive or to limit the invention to the precise form described herein, and modifications and variations are possible in light of the teachings above. For example, given the explanation above, it will be appreciated by those skilled in the art, to which the description pertains, that the FET sensing circuitry, including the window detect circuitry can be designed using various circuit components and implementations of the same. For example, the inputs of an amplifier (as, for example, in FIG. 2) can be coupled to the drain and source of the low-side switch so that current sensing is accomplished via the current through the low-side switch. As another example, current sensing can be accomplished by inserting a resistor in series with the drain or source of either the high-side MOSFET or low-side MOSFET with the inputs of an amplifier (as, for example, in FIG. 2) coupled across the resistor's terminals. Accordingly, the true scope and spirit of the invention is instead indicated by the following claims and their equivalents.

What is claimed is:

1. A switching regulator having a droop function, comprising:
   a high-side switch having a gate coupled to a regulator input configured to receive an input signal, a drain coupled to a power supply and a source;
   a low-side switch having a gate configured to receive an inverse of the input signal, a drain coupled to the source of the high-side switch and a source coupled to ground;
   an inductor having a first end coupled to the drain of the low-side switch and a second end providing an output voltage; and
   an amplifier having inputs coupled to the drain and source of the high-side switch and an output operable to provide a droop voltage signal.

2. The switching regulator of claim 1, further comprising a gain-setting resistor coupled to the amplifier, the gain-setting resistor operable to control a magnitude of the droop voltage signal.

3. The switching regulator of claim 2, wherein a resistance of the gain-setting resistor is selectable.

4. The switching regulator of claim 1, wherein the droop voltage signal is directly proportional to a drain-to-source current through the high-side switch when the high-side switch is turned on and when the amplifier provides a unity gain condition.

5. The switching regulator of claim 1, wherein:
   the input signal is a pulse-width modulated (PWM) signal.

6. The switching regulator of claim 5, further comprising:
   a control loop coupled between the output of the amplifier and the regulator input, the control loop operable to provide the pulse-width modulated signal.

7. The switching regulator of claim 5, wherein a duty cycle of the pulse width modulated signal is reduced when the drain-to-source current through the high-side switch exceeds a predetermined value.

8. A method of maintaining an output voltage of a switching regulator within a voltage range, the switching regulator having a high-side switch and a low-side side switch, the method comprising the steps of:
   measuring a current through one of the high-side or the low-side switch of the switching regulator;
   converting the measured current to a voltage droop signal using a variable element; and
   adjusting an amount of droop of the output voltage by varying the variable element,
   whereby the voltage droop signal is operable to lower the output voltage of the switching regulator as the current measured through one of the high-side or the low-side switch increases.

9. The method of claim 8 wherein the step of measuring measures current through the high-side switch.

10. The method of claim 8 further comprising compensating for a temperature coefficient of the switch.

11. The method of claim 10 wherein the step of compensating comprises placing the variable element having a temperature coefficient that is opposite to that of the switch in thermal contact with the switch.

12. A switching regulator having a droop function, comprising:
   a high-side switch having a gate coupled to a regulator input configured to receive an input signal, a drain coupled to a power supply and a source;
   a low-side switch having a gate configured to receive an inverse of the input signal, a drain coupled to the source of the high-side switch and a source coupled to ground;
   an inductor having a first end coupled to the drain of the low-side switch and a second end providing an output voltage; and
   an amplifier having inputs coupled to one of either the low-side switch or the high-side switch, and an output operable to provide a droop voltage signal.

13. The switching regulator of claim 12, further comprising a gain-setting resistor coupled to the amplifier, the gain-setting resistor operable to control a magnitude of the droop voltage signal.

14. The switching regulator of claim 13, wherein a resistance of the gain-setting resistor is selectable.

15. The switching regulator of claim 13 wherein the gain-setting resistor has a temperature coefficient that is opposite that of the one of either the low-side switch or the high-side switch that is coupled to the amplifier.

16. The switching regulator of claim 15 wherein the gain-setting resistor is thermally coupled to the one of either the low-side switch or the high-side switch that is coupled to the amplifier.

17. The switching regulator of claim 12, wherein the droop voltage signal is directly proportional to a drain-to-source current through the one of the low-side switch or the high-side switch that couples to the amplifier, when that switch is turned on and when the amplifier provides a unity gain condition.

18. The switching regulator of claim 12, wherein the input signal is a pulse-width modulated (PWM) signal.

19. The switching regulator of claim 18, further comprising a control loop coupled between the output of the amplifier and the regulator input, the control loop operable to provide the pulse-width modulated signal.

20. The switching regulator of claim 18, wherein a duty cycle of the pulse width modulated signal is reduced when the drain-to-source current through the one of the low-side switch or the high-side switch that couples to the amplifier increases.

* * * * *